United States Patent
Farrier et al.

(10) Patent No.: US 8,393,967 B2
(45) Date of Patent: Mar. 12, 2013

(54) CONSTRUCTION OF GAMING MESSAGES WITH CONTEXTUAL INFORMATION

(75) Inventors: Andrew Heth Farrier, Sammamish, WA (US); Derek J. Carroll, III, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1638 days.

(21) Appl. No.: 11/741,353

(22) Filed: Apr. 27, 2007

(65) Prior Publication Data

US 2008/0268960 A1 Oct. 30, 2008

(51) Int. Cl.
*A63F 9/24* (2006.01)
*G06F 15/16* (2006.01)
(52) U.S. Cl. ........... 463/42; 709/204; 709/205; 709/206
(58) Field of Classification Search ................ 463/42; 709/204–206
See application file for complete search history.

(56) References Cited

U.S. PATENT DOCUMENTS

| | | | | |
|---|---|---|---|---|
| 5,149,104 | A | 9/1992 | Edelstein | 273/434 |
| 5,377,997 | A * | 1/1995 | Wilden et al. | 463/43 |
| 6,623,009 | B1 | 9/2003 | Kraemer et al. | 273/272 |
| 6,807,562 | B1 | 10/2004 | Pennock et al. | 709/204 |
| 7,192,351 | B2 * | 3/2007 | Rozkin et al. | 463/40 |
| 7,908,324 | B2 * | 3/2011 | Shochet et al. | 709/205 |
| 8,176,135 | B2 * | 5/2012 | Lau et al. | 709/206 |
| 2001/0047346 | A1 | 11/2001 | Liu et al. | 706/13 |
| 2002/0137565 | A1 * | 9/2002 | Blanco | 463/46 |
| 2004/0143852 | A1 | 7/2004 | Meyers | 725/133 |
| 2005/0181878 | A1 | 8/2005 | Danieli et al. | 463/42 |
| 2006/0074980 | A1 | 4/2006 | Sarkar | 707/104.1 |
| 2006/0252515 | A1 * | 11/2006 | Walker et al. | 463/25 |
| 2007/0259707 | A1 * | 11/2007 | Kang | 463/16 |
| 2008/0268960 | A1 * | 10/2008 | Farrier et al. | 463/42 |

FOREIGN PATENT DOCUMENTS

GB 2422558 8/2006

OTHER PUBLICATIONS

The Halo 2 Manual.*
Manninen, "Virtual Team Interactions in Networked Mulitmedia Games, Case: "Counter-Strike"—Multi-player 3D Action Game," In Proceedings of PRESENCE 2001 Conference, May 21-23, Philadelphia, USA, Temple University.
Ocampo, J., Shadowrun Exclusive Hands-On, Gamespot, http://www.gamespot.com/xbox360/action/shadowrun/news.html?sid=6164278, Jan. 2007.

* cited by examiner

*Primary Examiner* — Xuan Thai
*Assistant Examiner* — Michael Grant
(74) *Attorney, Agent, or Firm* — Westman, Champlin & Kelly, P.A.; Theodore M. Magee

(57) ABSTRACT

A message is received on a gaming device from a player. The message provides a message identifier and an identifier for the player. Using the message identifier and game state information related to an avatar that is displayed in a gaming environment and is associated with the player, a contextual message is constructed that includes more game state information than is present in the message. The contextual message is displayed on a display of the gaming device.

19 Claims, 11 Drawing Sheets

CONSTRUCTION OF GAMING MESSAGES WITH CONTEXTUAL INFORMATION

BACKGROUND

Multi-player games utilize network connections between gaming consoles or personal computers to allow players to play a game within a single gaming environment. In many games, players in distant locations from each other are grouped together on the same team or operating unit. In order for the players to work together, the players should be able to communicate with one another. Gaming systems have been provided that allow for voice communications between players. However, for many players, especially new players, it is difficult for the player to describe their current location or what they are observing to their other team members during the excitement of the game. Further, relying on voice communications creates language barriers to game play between players in different countries.

The discussion above is merely provided for general background information and is not intended to be used as an aid in determining the scope of the claimed subject matter.

SUMMARY

A message is received on a gaming device from a player. The message provides a message identifier and an identifier for the player. Using the message identifier and game state information related to an avatar that is displayed in a gaming environment and is associated with the player, a contextual message is constructed that includes more game state information than is present in the message. The contextual message is displayed on a display of the gaming device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
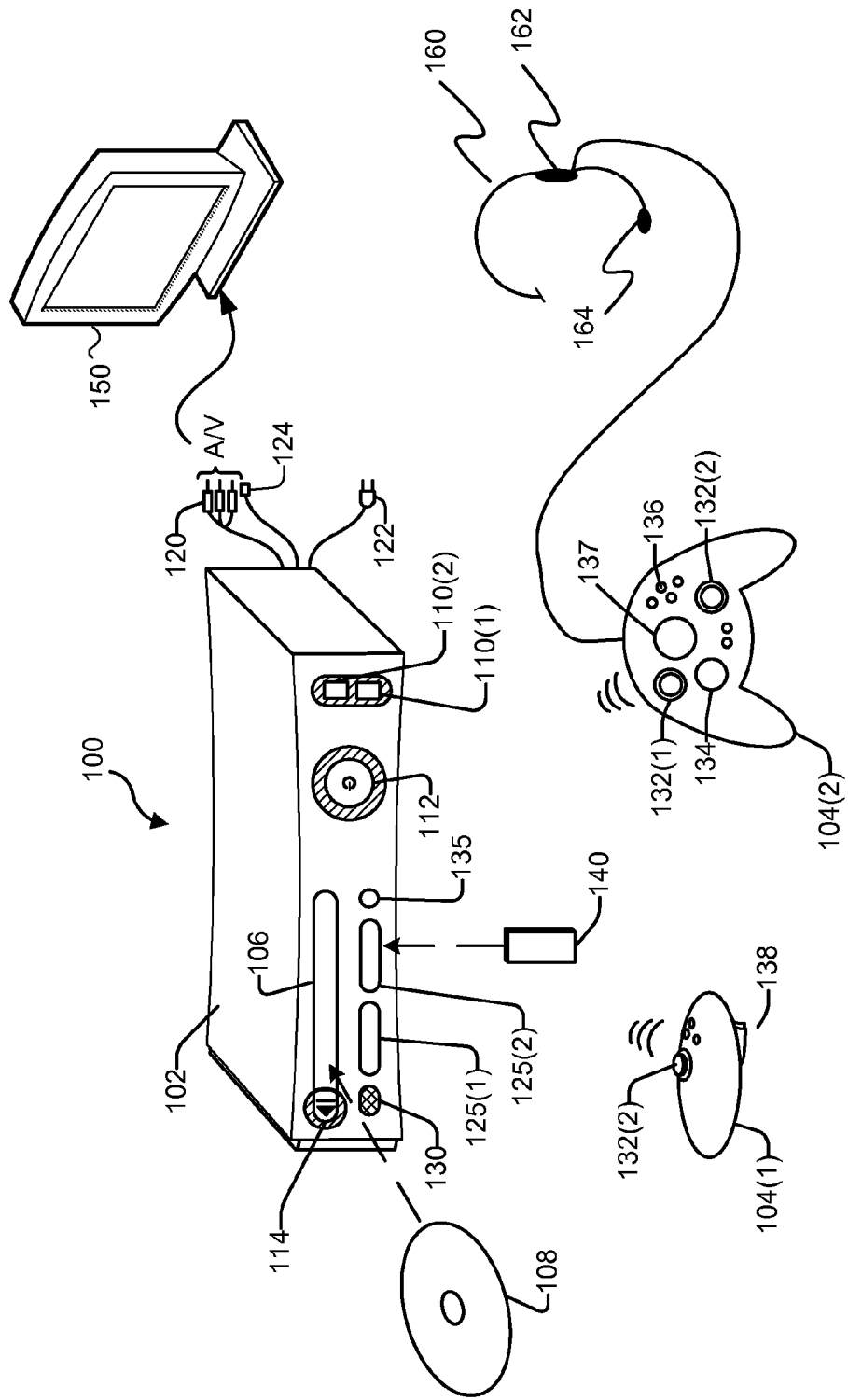
FIG. 1 is a perspective view a gaming console.

FIG. 1 shows an exemplary gaming and media system 100. The following discussion of this Figure is intended to provide a brief, general description of a suitable environment in which certain methods may be implemented.

As shown in FIG. 1, gaming and media system 100 includes a game and media console (hereinafter "console") 102. Console 102 is configured to accommodate one or more wireless controllers, as represented by controllers 104(1) and 104(2). A command button 135 on console 102 is used create a new wireless connection between on of the controllers and the console 102. Console 102 is equipped with an internal hard disk drive (not shown) and a media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140.

Console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (not shown) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, User Guide button 137 and two triggers 138. By pressing and holding User Guide button 137, a user is able to power-up or power-down console 102. By pressing and releasing User Guide button 137, a user is able to cause a User Guide Heads Up Display (HUD) user interface to appear over the current graphics displayed on monitor 150. The controllers described above are merely representative, and other known gaming controllers may be substituted for, or added to, those shown in FIG. 1.

Controllers 104 each provide a socket for a plug of a headset 160. Audio data is sent through the controller to a speaker 162 in headset 160 to allow sound to be played for a specific player wearing headset 160. Headset 162 also includes a microphone 164 that detects speech from the player and conveys an electrical signal to the controller representative of the speech. Controller 104 then transmits a digital signal representative of the speech to console 102. Audio signals may also be provided to a speaker in monitor 150 or to separate speakers connected to console 102.

In one implementation (not shown), a memory unit (MU) 140 may also be inserted into one of controllers 104(1) and 104(2) to provide additional and portable storage. Portable MUs enable users to store game parameters and entire games for use when playing on other consoles. In this implementation, each console is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, from a peripheral storage device connected to USB connections 110 or from MU 140.

Figure 2:
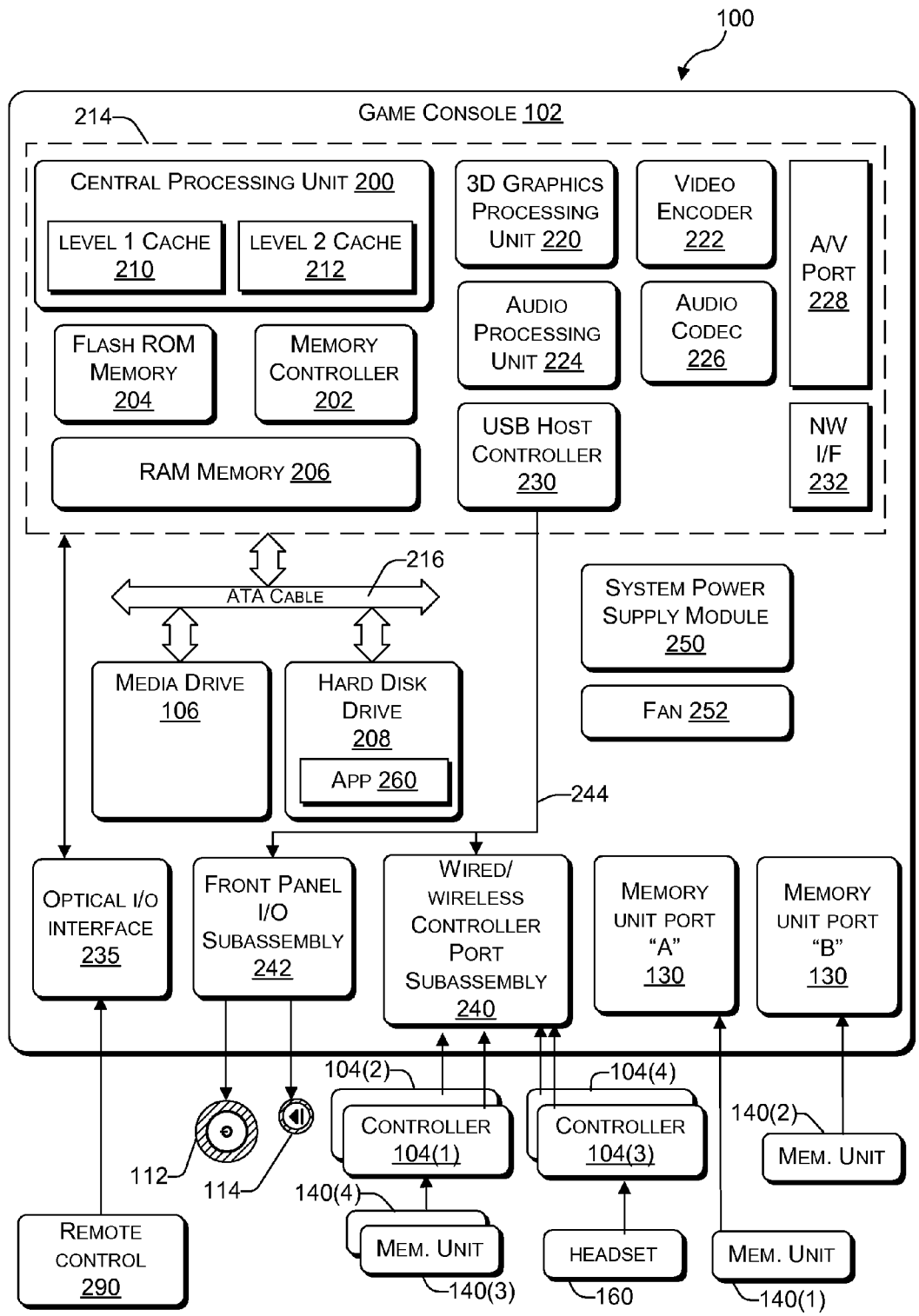
FIG. 2 is a block diagram of components of a gaming console.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and media drive 106 are shown connected to the memory controller via the PCI bus and an AT Attachment (ATA) bus 216. However, in other implementations, dedicated data bus structures of different types can also be applied in the alternative.

In some embodiments, ROM 204 contains an operating system kernel that controls the basic operations of the console and that exposes a collection of Application Programming Interfaces that can be called by games and other applications to perform certain functions and to obtain certain data.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display containing one or more speakers. Some audio data formed by audio processing unit 224 and audio codec 226 is also directed to one or more headsets through controllers 104. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a Bluetooth module, a cable modem, and the like.

In the implementation depicted in FIG. 2, console 102 includes a controller support subassembly 240, for supporting up to four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(4)) are illustrated as being connectable to controller 104(1), i.e., two MUs for each controller. Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

Headset 160 is shown connected to controller 104(3). Each controller 104 may be connected to a separate headset 160.

A system power supply module 250 provides power to the components of gaming system 100. A fan 252 cools the circuitry within console 102.

Under some embodiments, an application 260 comprising machine instructions is stored on hard disk drive 208. Application 260 provides a collection of user interfaces that are associated with console 102 instead of with an individual game. The user interfaces allow the user to select system settings for console 102, access media attached to console 102, view information about games, and utilize services provided by a server that is connected to console 102 through a network connection. When console 102 is powered on, various portions of application 260 are loaded into RAM 206, and/or caches 210 and 212, for execution on CPU 200. Although application 260 is shown as being stored on hard disk drive 208, in alternative embodiments, application 260 is stored in ROM 204 with the operating system kernel.

Gaming system 100 may be operated as a standalone system by simply connecting the system to monitor, a television 150 (FIG. 1), a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participant in a larger network gaming community allowing, among other things, multi-player gaming.

Figure 3:
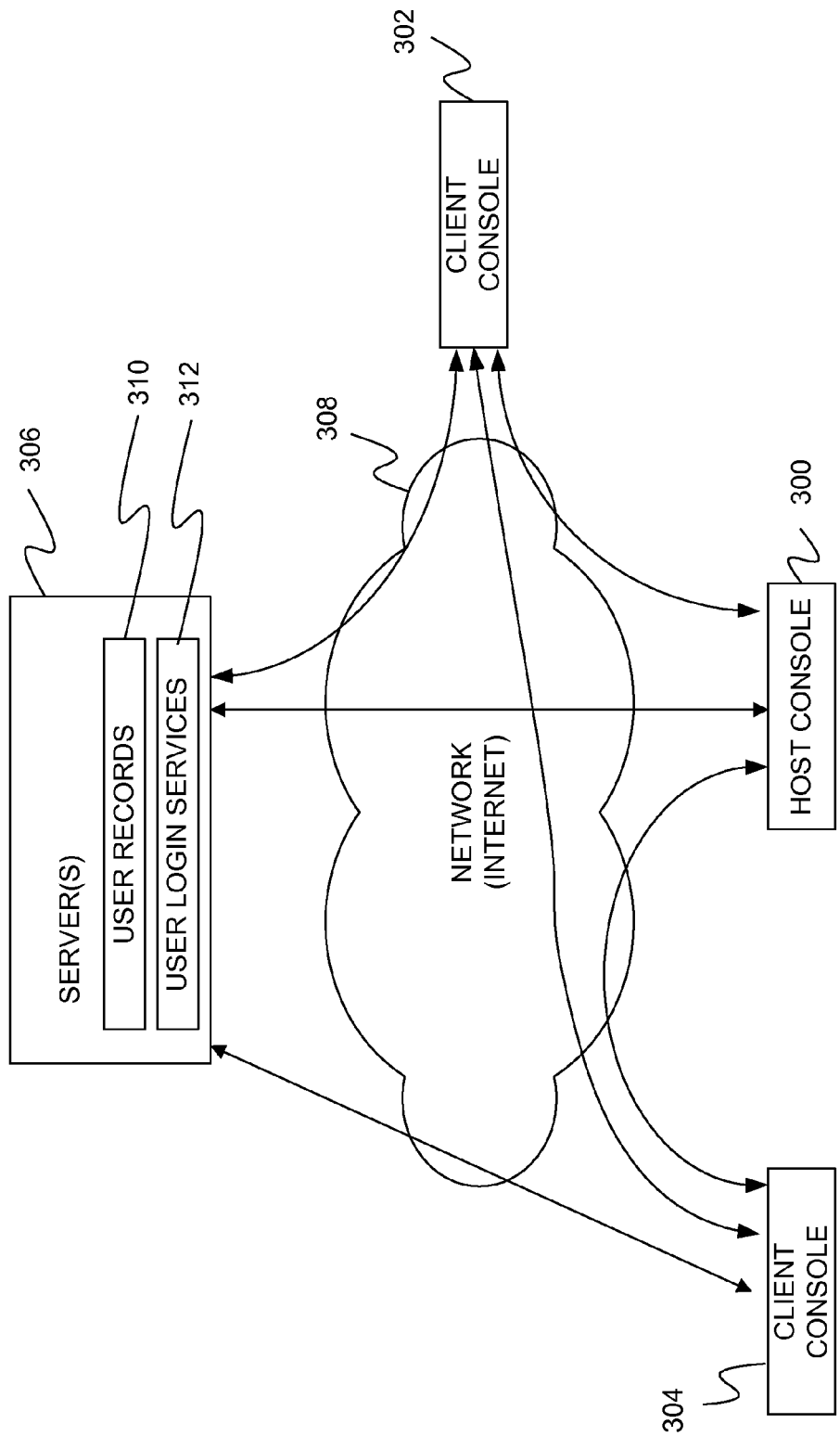
FIG. 3 is a block diagram of network connections between gaming consoles.

FIG. 3 provides a block diagram of multiple consoles 300, 302 and 304 networked together and with one or more servers 306 through a network 308. Under one embodiment, network 308 comprises the Internet. In one implementation, consoles 300, 302 and 304 communicate with server(s) 306 over a virtual private network (VPN) that utilizes a secure protocol (e.g., secure socket layer "SSL") to communicate encrypted information through the Internet. In another application, consoles 300, 302 and 304 communicate with server(s) 306 by making calls to dedicated application program interfaces (APIs) using a secure communication protocol that enables closed-network communication. In general, the communication architecture between consoles 300, 302 and 304 and server(s) 306 excludes other general purpose computing devices from communicating with server(s) 306.

Server(s) 306 provide a collection of services that users and applications running on console 300, 302 and 304 may invoke and utilize. In order to restrict access to the services on server(s) 306 and in order to provide custom services to individual users, many embodiments require the user to login to the server(s) 306 using user login services 312. During login, login services 312 obtain a Gamertag (a unique identifier associated with the user) and a password from the user, as well as a console ID that uniquely identifies the console that the user is using and a network path to the console. The Gamertag and password are authenticated by comparing them to information stored in user records 310, which may be located on the same server as user login services 312 or may be distributed on a different server or a collection of different servers. Once authenticated, user login services stores the console ID and the network path in user records 310 so that messages and downloadable content may be sent to the console.

Once players on each of consoles 300, 302 and 304 have logged into server 306, they may participate in a multi-player game. To start the game, a player on one console, denoted as host console 300, installs and runs a game on the console and sends invitations through system server 306 to the players on client consoles 302 and 304 to join the game. Players on client consoles 302 and 304 then install and run the game on their consoles to accept the invitation. When an invitation is accepted, system server 306 provides the consoles with network address information so that they can communicate directly with each other.

When the players have indicated that they are ready to play, host console 300 sends initial game state information to each of the other consoles indicating the position and status of every object and avatar in the three-dimensional gaming environment of the game and an identifier for a map that describes the gaming environment being used for this particular instantiation of the game. An avatar is a graphical representation of a character or object (such as a car) representing a player in the gaming environment. Players can include human players and Artificial Intelligence Robots (AI Bots) that control the movement of their avatar. Typically, the AI Bots are run within an Artificial Intelligence engine on host console 300. Each AI Bot has access to a set of knowledge about the game, which is stored as knowledge state information. This information includes knowledge about locations in the map, avatars and objects that were recently in the view of the avatar for the AI Bot, the location of the AI Bots avatar, and the objective of the game. An AI Bot controls their avatar by changing the state of the avatar in the game state information. Any change to the state of the avatar is broadcast to other consoles so that they may updated the position and actions of the AI Bot's avatar on their console.

Using their game controller, each player may move their avatar, and in some games cause their avatar to pick up or drop objects, perform some other action such as casting spells, or to engage in combat with other avatars in the graphical environment. Changes in the state of the avatar are made by the client console that the controller is connected to and are broadcast to other client consoles so that they may update their game state information accordingly. Typically, the state of movable objects in the gaming environment is tracked by host console 300, which receives messages from client consoles any time an object is moved, and then rebroadcasts that object state information to the other client consoles. Having host console 300 control the updates of state information for objects helps to avoid conflicts between two consoles that are attempting to update the object's state in different ways.

Figure 4:
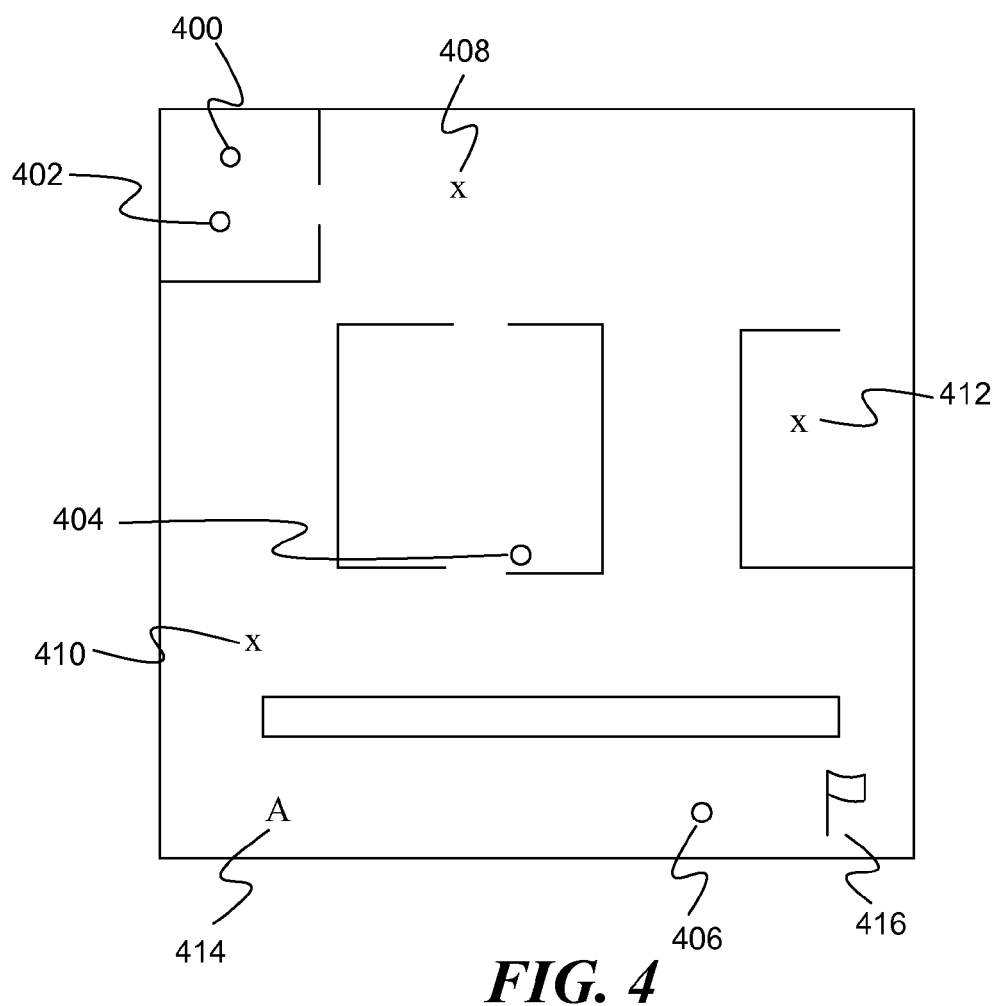
FIG. 4 is a representation of a gaming map in two dimensions.

FIG. 4 provides a simplified two-dimensional top view of a map of a gaming environment. In the map, avatars for one team are shown as small circles such as circles 400, 402, 404 and 406 and avatars for another team are shown as x's 408, 410 and 412. An avatar for an AI Bot is shown as A 414 and is part of the same team as the x avatars. In addition, the map contains an important object 416, which may be the key to a game, such as capture the flag. The map includes multiple rooms that are defined by a set of walls and doorways. Each location in the map is defined by a set of coordinates such that the game state information for the avatars and objects includes coordinates indicating the position of the avatars and objects. Although rooms are shown in FIG. 4, other maps may be used that utilize roads, mountains, forests, paths, planets, and/or galaxies, for example.

Even within the simplified map of FIG. 4, a game player may have a difficult time describing where they are in the map and what they are able to see to their fellow players. This is especially true for new players who are unfamiliar with the map or the terminology of the game. As a result, it is difficult for players to send voice messages to other players to communicate their position or what they can see. In addition, because client consoles can be located in different countries and players can speak different languages, relying on voice commands can be troublesome since other players may not understand the message that is being sent.

In the embodiments described below, these difficulties are overcome by allowing the users to select a simple message using the controller such as "come here", "go there" and "update". These simple messages are automatically augmented by the consoles to include contextual information such as a location name for the location of the avatar issuing the message, the number, kind and location of enemies that the sending avatar has seen recently, important objects that the avatar is either holding or can see, and a location where the avatar is currently looking.

Figure 5:
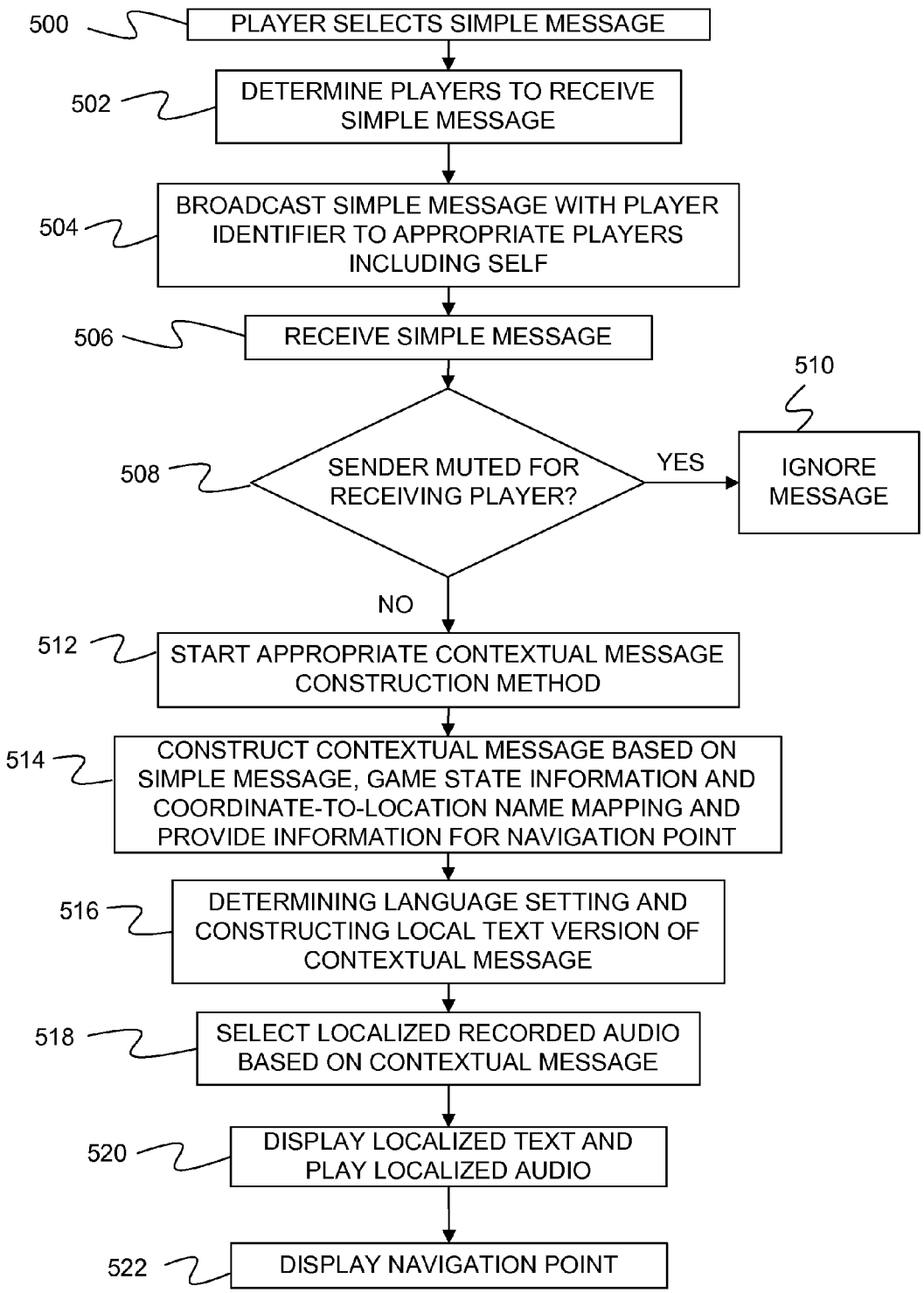
FIG. 5 is a flow diagram of an overall method for augmenting messages.
Figure 6:
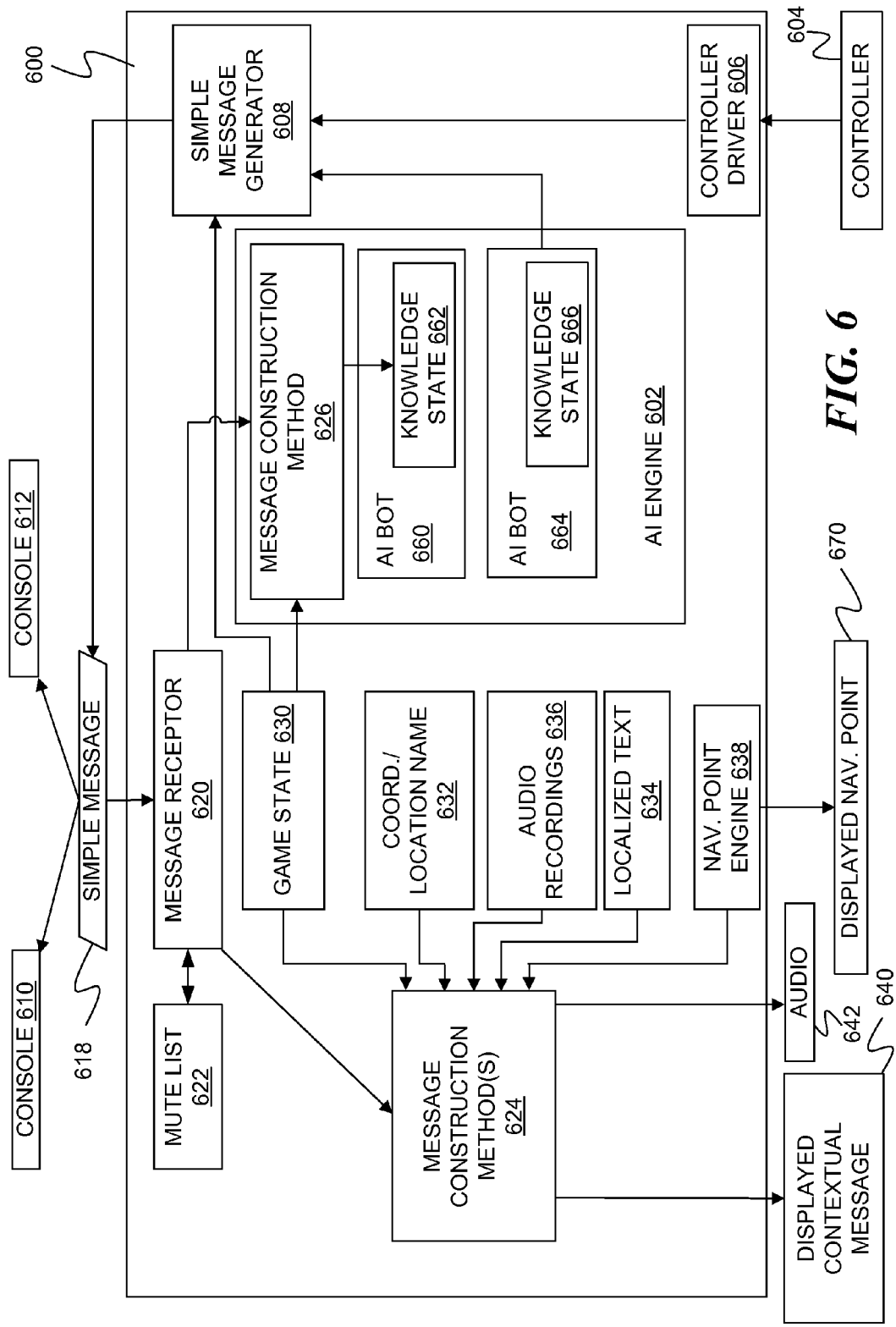
FIG. 6 is a block diagram of elements of a console used to process messages.

FIG. 5 provides a flow diagram for a method for generating and providing augmented contextual messages to players. FIG. 6 provides a block diagram of elements used in a console 600 in the method of FIG. 5.

In step 500, a human player or an AI Bot 664 selects a simple message. Under one embodiment, a human player selects a simple message by activating a button or a trigger dedicated to the message on controller 604. Under one embodiment, different messages are associated with different positions on the D-pad of controller 604. When a user activates a button on the controller, a control driver 606 sends a message to a simple message generator 608 indicating which button has been pressed. Simple message generator 608 uses the button information to determine which message the user has selected. It then invokes a simple generation method associated with that message. AI Bot 664 selects a message by directly invoking the proper simple message generation method in simple message generator 608.

At step 502, simple message generator 608 determines which client consoles 600, 610, and 612 are to receive the simple message based on information in game state 630 that indicates which players are on the same team as the human player or AI Bot 664 and the consoles associated with those players.

At step 504, simple message generator 608 creates simple message 618 and broadcasts the simple message to the identified clients including the client console 600. The simple message 618 is broadcast along with an identifier of the player or AI Bot that selected the simple message.

Simple message 618 does not include contextual information but instead typically includes a simple identifier of the message being issued such as "come here", "go there" and "update". By limiting the amount of information sent in message 618, the impact on network bandwidth between the consoles caused by the transmission of the message is limited and performance this thereby improved.

At step 506, message 618 is received by a message receptor 620 on each of client consoles 600, 610, and 612. The message includes a message identifier, such as a message name, and an identifier of the player that sent the message. In the discussion below, the handling of the message is discussed with reference to client 600, however, the same handling is to be understood to take place in each of client consoles 610 and 612.

At step 508, the message receptor 620 determines if the player that sent message 618 is on a muted list 622. In some gaming consoles, players can choose to exclude communication from certain other players. This is typically done to exclude vocal communications from other players when those players use objectionable language or are otherwise unpleasant. In some embodiments, muted list 622 is based on user records 310 on servers 306. If the sender of the simple message is on muted list 622, the message is ignored at step 510.

If the sender is not on muted list 622 at step 508, message receptor 620 invokes an appropriate contextual message construction method at step 512. Under one embodiment, different construction methods are provided for each type of simple message. In other embodiments, a single method is provided that can handle all types of simple messages. In FIG. 6, two separate contextual construction messages are shown. Contextual construction method 624 is provided for contextual messages that are constructed for human players and contextual construction method 626 is provided for contextual messages that are constructed for AI Bots. However, those skilled in the art will recognize that additional message construction methods may be provided.

At step 514, the instantiated message construction method determines a contextual message and possible navigation point information based on the identifier for the simple message and game state information stored in game state 630. Game state 630 includes information about the current state of the gaming world including the location of each avatar and object in the world, the current conditions or states of those avatars and objects and any current actions involving those avatars or objects. Game state 630 also contains information about the current view of each avatar and objects and other avatars that the avatar has seen recently. Under one embodiment, this includes objects an avatar has seen within the last two seconds. Game state 630 may take the form of a programming object or a database and is typically stored in memory.

The avatar associated with the player that sent the simple message is referred to as the sending avatar. Based on the location of the sending avatar, the objects and other avatars that the sending avatar has recently seen, the sending avatar's team, the objects held by the sending avatar, and the objective of the sending avatar, the message construction method adds additional contextual information to construct a contextual message. In particular, based on this information, the message construction method will select a type of message from a collection of possible messages that each includes variables as to locations, numbers, enemy types, and object types. The message construction method will then set the variables within the message based on the information from the game state. Note that game state 630 provides locations in terms of map coordinates that are not particularly useful to players. To make the location information more useful to players, the message construction method converts the coordinates into a location name using a coordinates-to-location name mapping 632.

The message constructed in step 514 includes more game state information than was present in the simple message. In particular, the contextual message can include game state information such as a location name for the position of the sending avatar in the gaming environment, a count of other avatars recently viewed by the sending avatar, location names for the position of other avatars recently viewed by the sending avatar, an indication that an object was recently viewed by the sending avatar, and a location of an object recently viewed by the sending avatar.

Message construction method 624 also sends the location of an object, enemy, or the sending avatar to a navigation point engine 638. Navigation point engine 638 uses the position of the object, enemies, or sending avatar and the location of the avatar associated with the player receiving the message to display navigation points in the gaming environment that assists the receiving player in locating the object, enemy, or sending avatar. In particular, such navigation points will typically show a graphical icon with an arrow pointing in the direction that the player should follow in order to reach the object, enemy or sending avatar. Such navigation aids in combination with the location name provided in the contextual message on the display, helps human players to learn the position of certain location names in the graphical gaming world.

Under one embodiment, at step 516, a language setting for the console or the game is determined and is used to construct a localized version of the contextual message using localized text 634. Localized text 634 contains textual components that can be used to convert each possible contextual message into a different language. For example, if a Japanese version of the game is being played, localized text 634 would include components for converting the contextual messages into Japanese. Localized text 634 may include other languages with the selection of the language being dependent upon a language setting in console 600 or within the game.

Because of localized text 634, players who speak different languages can still communicate to each other to convey information about the location of avatars and objects in the graphical environment as well as messages directing players to take certain actions. With this system, a single command sent by one player will automatically be augmented with contextual information and the full contextual message can automatically be translated into multiple languages. This allows teams of players to cooperate with each other even though they all speak different languages.

At step 518, the full contextual message is used to select a localized audio recording from audio storage 636. The localized audio recording is in the language set for the game or for the client console. The audio recording corresponds to the localized text for the message and typically includes the same information found in the localized version of the contextual message.

At step 520, the localized text is displayed on a display screen as displayed text 640 and the localized audio is produced through a speaker as audio 642. In one embodiment, the displayed localized text is displayed in a corner of the display so as to limit obscuring the view of the graphical environment. In some embodiments, the audio is played through a headset that the player wears and that is connected to controller 604.

At step 522, the navigation point, if any, produced by navigation point engine 638 is displayed in the graphical environment based on the information provided by the message construction method.

Figure 7:
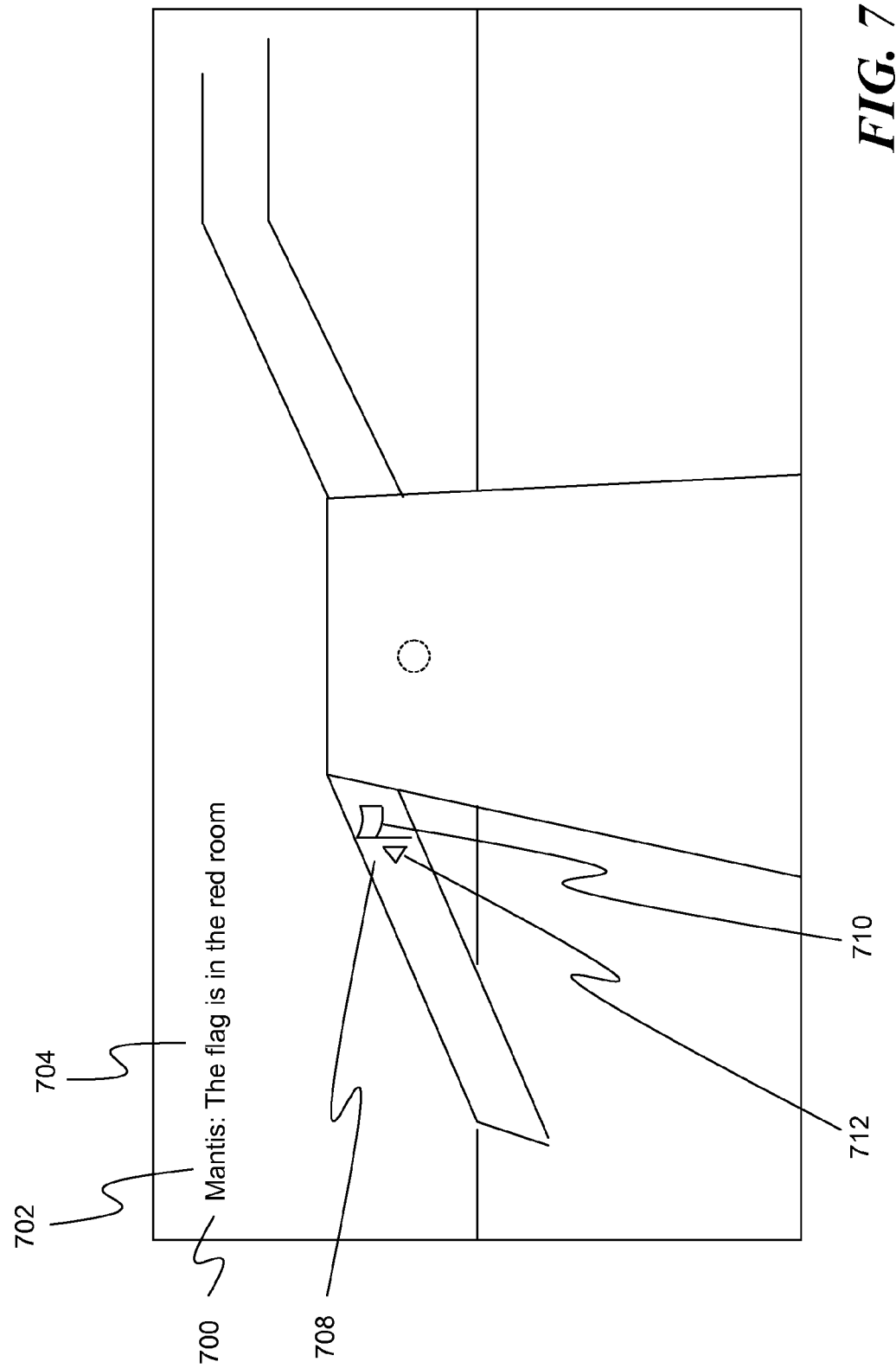
FIG. 7 is a screen shot showing a displayed contextual message.

FIG. 7 provides an example of a screen shot showing an augmented contextual message and a navigation point associated with the message displayed on the screen. Specifically, FIG. 7 shows message 700 that includes an identification 702 of the player "Mantis" who sent the message and the contextual message 704. FIG. 7 also shows navigation point 708. Contextual message 704 indicates that "The flag is in the red room." Navigation point 708 indicates the location of the flag based on this message by providing a flag icon 710 and an arrow icon 712 that points in the direction of the "red room." The message displayed on the screen is based on a simple message sent by Mantis that did not include a reference to the flag or the red room. The information about the flag being in the red room is based on game state information indicating that the avatar for Mantis had recently seen the flag in the red room. Thus, Mantis did not have to specifically include that information in the message but instead, that information was added by message construction method 624. Further note that the player viewing the screen of FIG. 7 does not need to know where the red room is since navigation point 708 indicates the direction to the red room. This helps new players to learn the layout of the graphical environment by providing a link between the location name "red room" and the navigation point.

Figure 8:
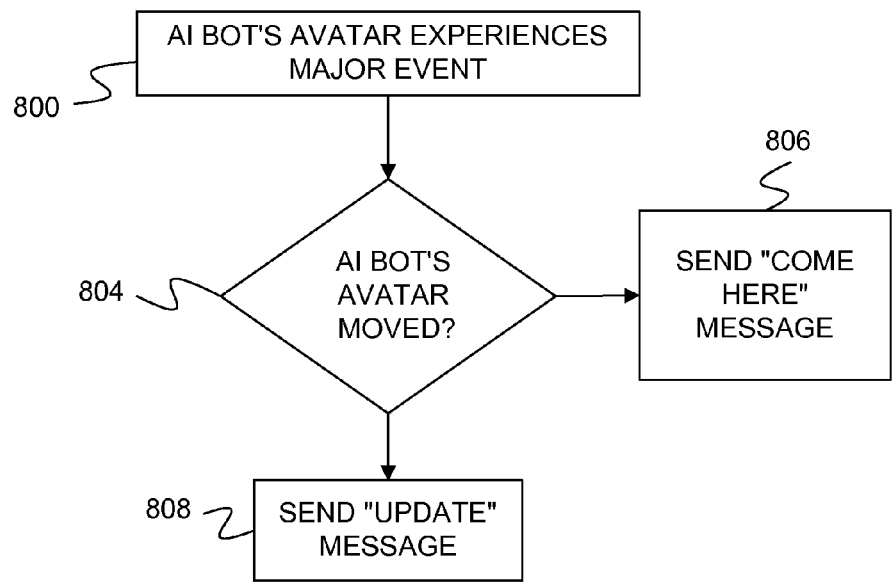
FIG. 8 is a flow diagram for an artificial intelligence unit issuing a message.

In the flow diagram of FIG. 5, it was indicated that an AI Bot can select and send a simple message. FIG. 8 provides a flow diagram of method for an AI Bot to select such a message.

In step 800, the AI Bot's avatar experiences a major event. Examples of major events include movement of the avatar to a new location, or objects or enemies appearing in the view of the avatar. At step 804, the method determines if the major event is the movement of the avatar. If the avatar has moved, the avatar will issue a simple "come here" message indicating that it has moved to a new position at step 806. When the "come here" message is received, a message will be constructed that includes the location name of the current location of the avatar. If the avatar has not moved at step 804, then the avatar has seen an important object or one or more enemy. As such, the AI Bot will select an "update" message at step 808. When this "update" message is received by the client consoles, a message will be constructed that includes information about what the avatar has seen recently and the avatar's current position.

Note that the AI Bot sends the same simple messages as other players. As such, it is difficult for other players to determine if the message is being sent by a human player or by an AI Bot. This uniformity can increase the pleasure of playing the game by making it appear as if there are more active participants in the game.

In FIG. 5, steps 508 through 522 for processing and augmenting a received message are steps performed for a human player. Under one embodiment, such received messages are also processed for each AI Bot that has an avatar in the game. A flow diagram for processing such received messages for an AI Bot is shown in FIG. 9.

In step 900, the simple message is received by message receptor 620. At step 902, message construction method 626 in artificial intelligence engine 602 is instantiated. At step 904, the instantiated message construction method determines the contextual message based on the simple message and game state information in game state 630. Formation of the contextual message is identical to the formation of the contextual message in step 514 for human users except that location names are not included in the contextual message. Instead, the coordinates from the game state are used since the AI Bot understands such coordinates. Like the contextual messages for the human players, the contextual message for the AI Bots includes more game state information than is found in the simple message.

Based on the information in the contextual message, the AI Bot, such as AI Bot 600 and AI Bot 664, updates information known by the AI Bot at step 906. This is done by changing or adding to information stored in a knowledge state, such as knowledge states 662 and 666 associated with AI Bots 660 and 664. Thus, if the contextual message indicates the location of another player's avatar or indicates the location of an important object or enemy seen by the other player's avatar, the AI Bot will have its knowledge state changed to indicate that the AI Bot is aware of this information. At step 908, the AI Bot invokes one or more decision making methods to make a decision about a course of action to take based on the updated information and any other information in the knowledge state. Examples of possible course of action include moving the AI Bot's avatar by changing the avatar's position, changing the avatar's view, or taking some other action. Based on its decision, AI Bot changes the state of the AI Bot's avatar in game state 630 and this change is broadcast to all of the consoles. If the view of an AI Bot's avatar changes for console that receives the change in state, the display is changed to reflect the change in the AI Bot's avatar at step 910.

Figure 9:
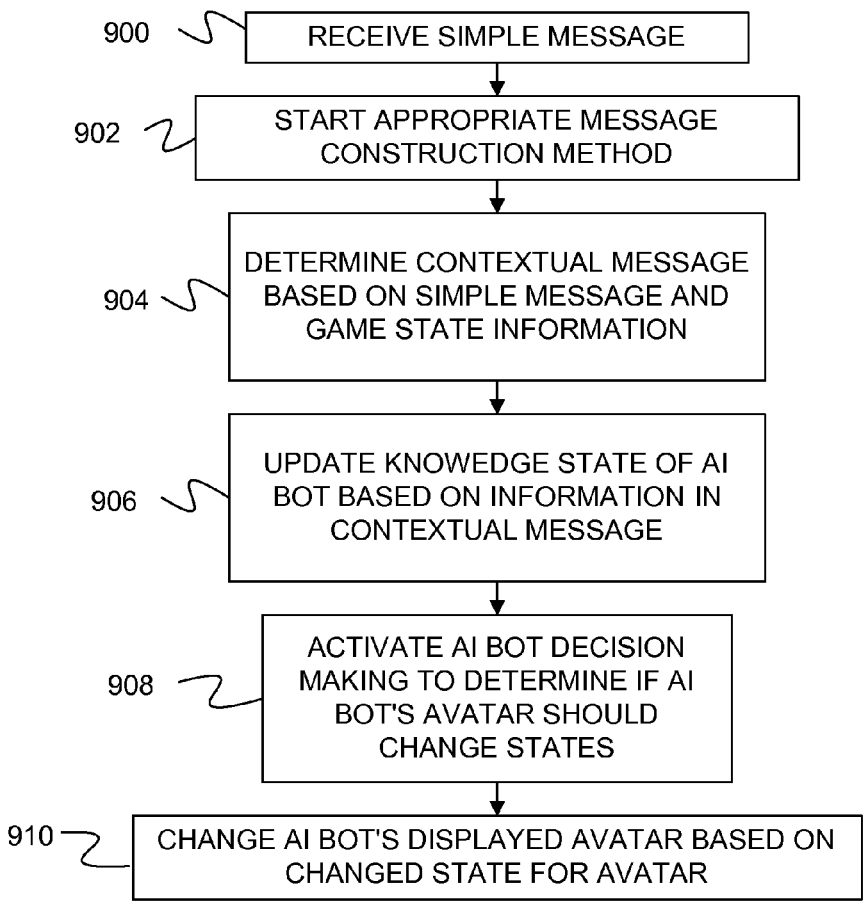
FIG. 9 is a flow diagram for processing performed by an artificial intelligence engine when it receives a message.

As shown in FIG. 9, AI Bots are able to receive messages from human players and to act on those messages by incorporating the contextual information associated with those messages into the AI Bot's knowledge state. This allows players to share information with AI Bots and to ask the AI Bots to move their avatars to different locations in the graphical world or to take some other action in the graphical world. In one embodiment, AI Bots are also able to receive messages from other AI Bots that control avatars in the game and to act on those messages. For example AI Bot 664 can send a simple message to AI Bot 660 that will be converted into a contextual message that includes information that AI Bot 660 can use to make a decision and change the state of its avatar.

Figure 10:
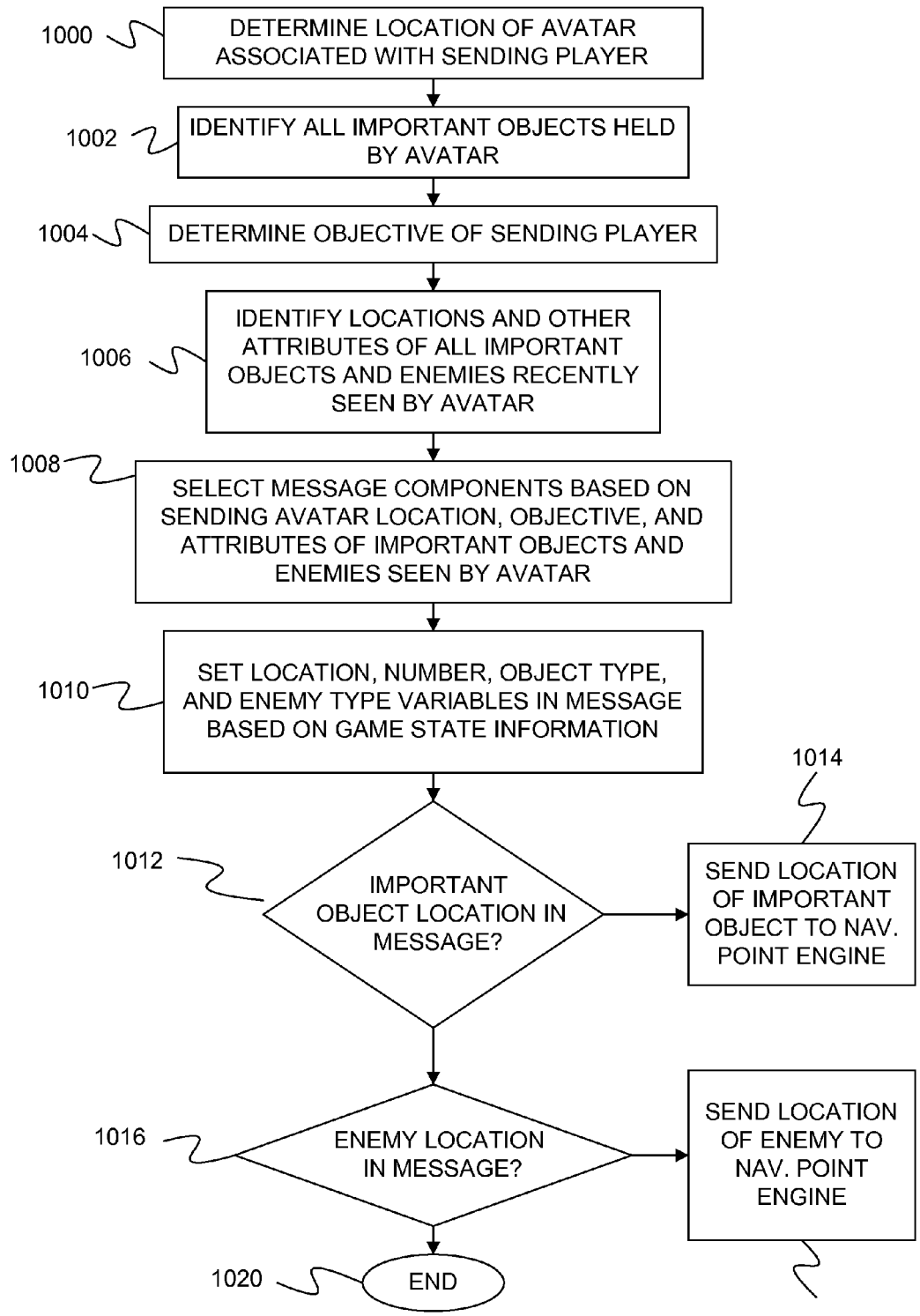
FIG. 10 provides a flow diagram for processing an "update" message.

FIG. 10 provides a flow diagram for constructing a contextual message from a simple "update" message under one embodiment. In step 1000, the message construction method uses the player name in the simple message to determine the location of the avatar associated with the player who sent the message. At step 1002, the method determines all important objects held by the avatar associated with the message and in step 1004 determines the objective of the sending player in the game. For example, in a capture the flag game, the objective can be to acquire the flag or to prevent another team from acquiring the flag.

At step 1006, the message construction method identifies all objects and enemies seen recently by the sending avatar. Under one embodiment, all objects or enemies seen within the last two seconds are identified. In addition to identifying the objects and enemies, information describing the objects or enemies is also collected such as the type of objects, the type of enemy, the number of enemy, the number of objects, and the locations of those enemies and objects.

Based on the information collected, the message construction method selects a message that conveys the information in a succinct manner. The messages selected in step 1008 are selected from a set of messages or message components that include text and variables. The variables can include numbers, object names, object types, enemy types, and location names, for example.

Under some embodiments, the message components are selected so as to limit the message to only the most important information so that the human player is not confused. For example, if the avatar had seen three of a first type of enemy in one room and two of a second type of enemy in another room at step 1008, the message construction method may select a message that simply states "I see <number> enemies" instead of a message such as "There are <number> <enemy-type> in the <location> and <number> <enemy-type> in the <location>", where the elements between < . . . > represent variables to be inserted into the message.

At step 1010, the variables for the selected message are set by the message construction method. Under one embodiment, location variables are set by retrieving the location name from coordinate-to-location-name map 632 using the coordinates from game state 630. Once the variables of the message have been set at step 1010, the contextual message is complete. At step 1012, the method determines if an important object's location is in the message. If the important object's location is in the message, that location along with an identification of the important object is sent to navigation point engine 638 at step 1014 so that navigation point engine 638 may generate a navigation point on the display for the important object. If an important object's location is not in the message at step 1012, the method determines if enemy locations are in the message at step 1016. If enemy locations are in the message at step 1016, the locations of the enemy and an indication that these locations are for enemies, is sent to navigation point engine 638 at step 1018. If an enemy location is not in the message at step 1016, the determination of the contextual message and the navigation point information is completed and ends at step 1020.

Figure 11:
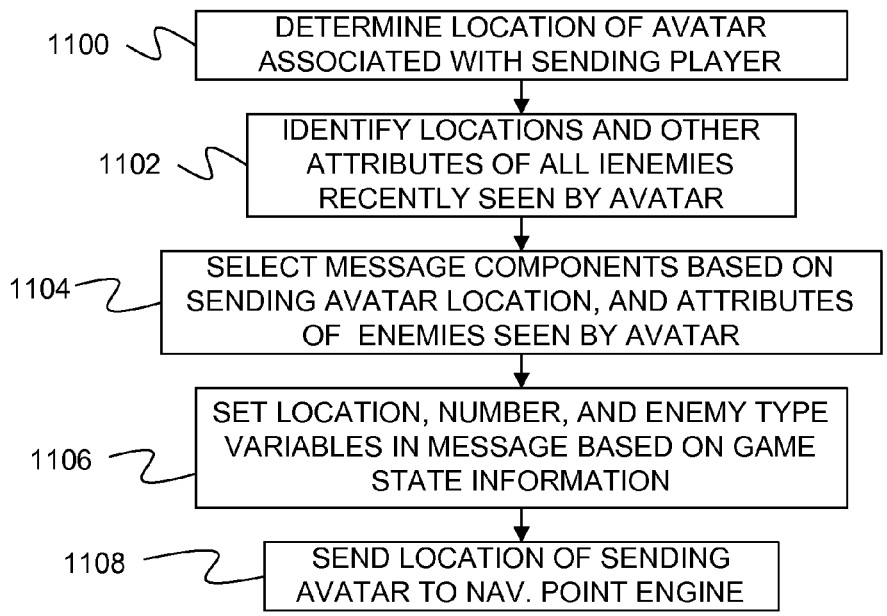
FIG. 11 provides a flow diagram for processing a "come here" message.

FIG. 11 provides a flow diagram forming a contextual message from a simple "come here" message. In step 1100 of FIG. 11, the message construction method determines the map coordinates of the sending avatar. At step 1102, the message construction method identifies enemies recently seen by the sending avatar and locations and attributes for those enemies. At step 1104, the method selects message components based on the location of the sending avatar, and the count, enemy type and locations of the enemies. The message components are selected from a set of messages that each includes variables for locations, numbers, and enemy type. The message components are selected by balancing the amount of information provided to the player with a desire to provide as much detailed information as possible. Thus, it is undesirable to select messages that would overwhelm the player with too much information or to select messages that provide too little information to be useful. At step 1106, the location, number and enemy-type variables, if any, in the selected message are set based on the information identified in steps 1100 and 1102. At step 1108, the coordinates of the location of the sending avatar and an indication that these coordinates are associated with a teammate are sent to navigation point engine 638, which makes a determination of whether to place a navigation point on the display to indicate the location of the teammate and where to place such a navigation point if one is to be added to the display.

Figure 12:
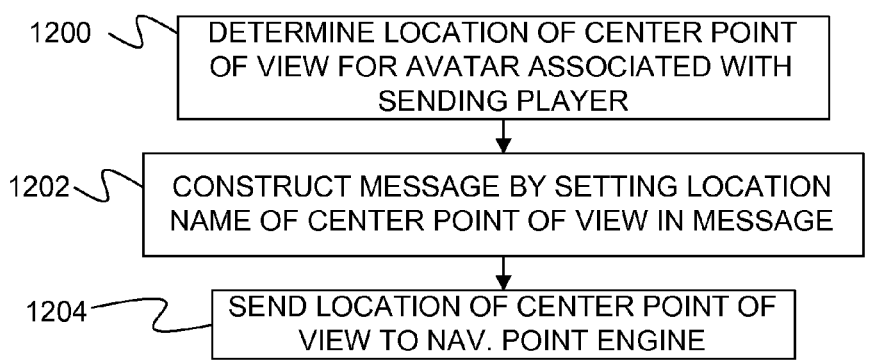
FIG. 12 provides a flow diagram for processing a "go there" message.

FIG. 12 provides a method of generating a contextual message from a simple "go there" message. In step 1200, the location of the center point of the sending avatar's view is determined from the game state. This center point of view is determined based on a three-dimensional projection in the three-dimensional graphical space of the center of the avatar's view. At step 1202, a location name variable in a message is set based on the coordinates determined in step 1200, using coordinates-to-location-name map 632 of FIG. 6.

At step 1204, the coordinates of the location of the center point of the sending avatar's view is sent to navigation point engine 638 so that the navigation point engine can determine whether and where to add a navigation point in the graphical display to lead the player to the location set in the contextual message.

Although only three simple messages—"update", "come here" and "go there"—are discussed above, other types of simple messages may be implemented under the present invention. In fact, any simple message that can be expanded based on game state information may be sent between the players.

Figure 13:
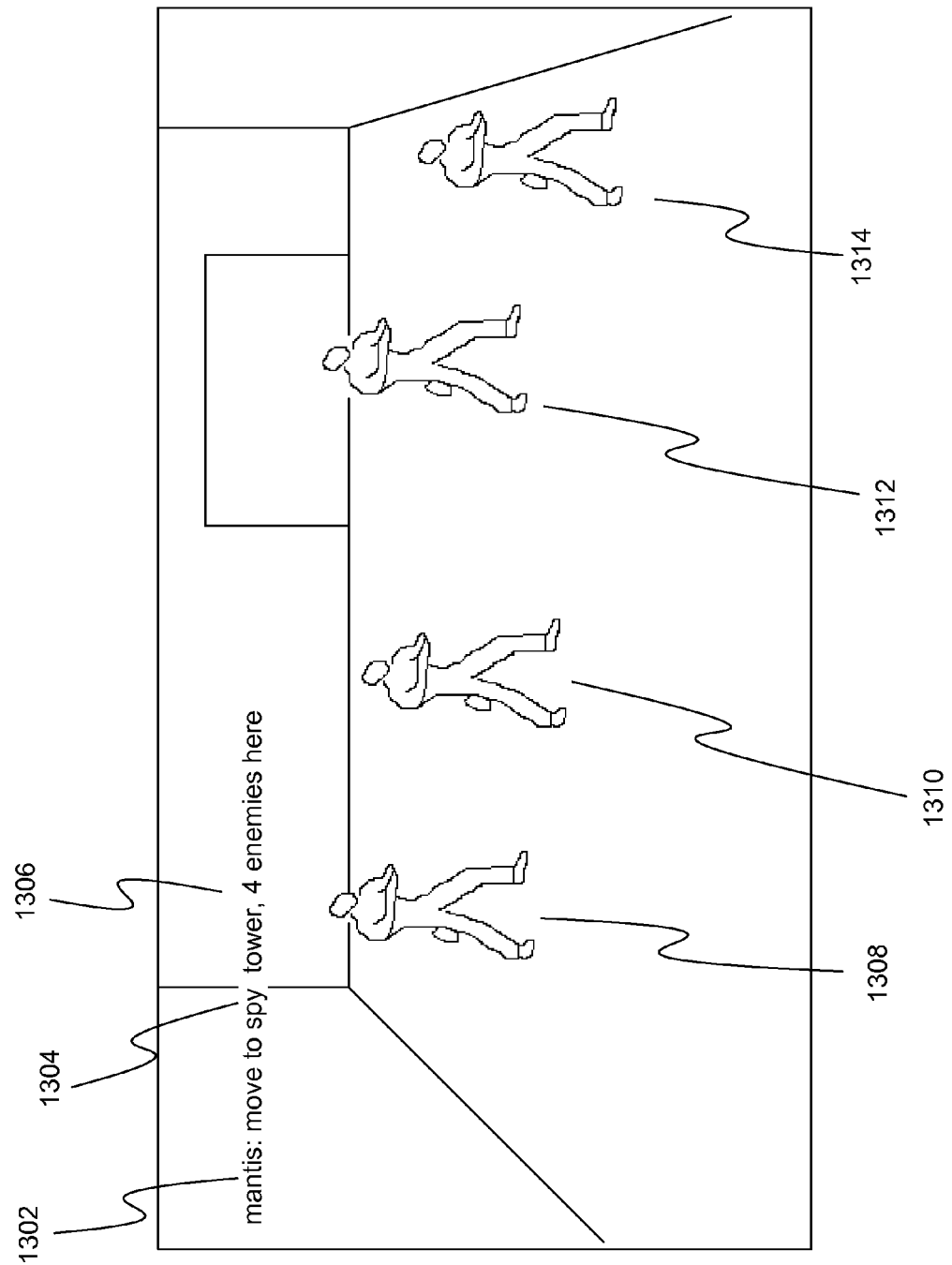
FIG. 13 is a screen shot showing a contextual message formed from a "come here" message.

FIG. 13 provides a screen shot of a view of a graphical environment from the point of view of a sending avatar that has issued a simple "come here" message. In response, a contextual message has been generated on the player's display as well as all other team members' displays that indicates the player's name "Mantis" 1302, the player's location "spy tower" 1304, and that there are four enemies 1306 in the spy tower. The view also shows the four enemies 1308, 1310, 1312 and 1314 within the spy tower.

Although the embodiments discussed above have been described in connection with a dedicated gaming device, the embodiments may be practiced with other types of computing devices that have been networked together to provide multi-player gaming.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
receiving a simple message at a gaming device, the simple message comprising a message identifier and an identifier for a player who sent the simple message;

a processor in the gaming device using the message identifier and game state information related to an avatar that is displayed in a gaming environment and is associated with the player to select a message from a collection of possible messages that each includes at least one variable and setting a value for a variable within the selected message based on the game state information to construct a contextual message; and displaying the contextual message on a display of the gaming device.

2. The method of claim 1 wherein the game state information of the contextual message comprises at least one of a group consisting of: a location name for the position of the avatar in the gaming environment, a count of other avatars recently viewed by the avatar, a location name for the position of other avatars recently viewed by the avatar, a name of an object held by the avatar, an indication that an object was recently viewed by the avatar, and a location of an object recently viewed by the avatar.

3. The method of claim 1 wherein constructing a contextual message further comprises identifying a language for the contextual message based on a language setting, and converting the contextual message into a different language based on the language setting.

4. The method of claim 1 further comprising selecting at least one audio recording that contains information in the contextual message and playing the audio recording through a speaker associated with the gaming device.

5. The method of claim 4 wherein selecting at least one audio recording comprises selecting an audio recording based on the language of the contextual message.

6. The method of claim 1 further comprising constructing a second contextual message based on the message identifier and the identifier for the player, the second contextual message being different from the contextual message, and providing the second contextual message to an artificial intelligence robot.

7. The method of claim 6 further comprising updating at least one knowledge state of the artificial intelligence robot to include game state information found in the second contextual message and having the artificial intelligence robot make a decision based on the at least one updated knowledge state.

8. The method of claim 1 wherein the player is an artificial intelligence robot.

9. The method of claim 1 further comprising displaying a navigation point based in part on the game state information in the contextual message.

10. A memory device in a gaming device having computer-executable instructions for performing steps comprising:
receiving a message from a separate gaming device, the message including information identifying a player who sent the message;
determining a language setting that indicates the language in which text is to be displayed;
retrieving game state information for a game being played on the gaming device;
constructing a contextual message based on the received message and the game state information;
converting the contextual message into a different language based on the language setting; and
displaying the contextual message in the different language on a display associated with the gaming device.

11. The memory device of claim 10 further comprising selecting an audio recording based on the contextual message and playing the audio recording through a speaker associated with the gaming device.

12. The memory device of claim 10 wherein the game state information comprises at least one type of information from a group of types of information consisting of: a position in a gaming environment of an avatar associated with the player, a count of other avatars recently viewed by the avatar associated with the player, a position in the gaming environment of other avatars recently viewed by the avatar associated with the player, a name of an object held by the avatar associated with the player, an indication that an object was recently viewed by the avatar associated with the player, and a location in the gaming environment of an object recently viewed by the avatar associated with the player.

13. The memory device of claim 10 wherein displaying the contextual message comprises displaying an identifier for the player who sent the message.

14. The memory device of claim 10 further comprising displaying a navigation point on the display based on game state information in the contextual message.

15. The memory device of claim 10 further comprising constructing a second contextual message based on the received message and the game state information, using the second contextual message to update information known by an artificial intelligence bot that is represented by an avatar in a graphical gaming environment.

16. The memory device of claim 10 wherein the player that sent the message is an artificial intelligence bot and wherein the contextual message comprises a location name of a current location of an avatar that represents the artificial intelligence bot.

17. A method comprising:
receiving a message from a player of a game on a gaming device, the message including a message identifier and an identifier for the player, the message identifier identifying a message that requests other players move their avatars to a different location;
retrieving contextual information about a current state of the game based on the message identifier and the identifier for the player, the contextual information comprising a current location of an avatar associated with the player;
constructing a contextual message based on the contextual information and the message identifier, the contextual message comprising a request for other players to move their avatars to a different location based on the current location of the avatar associated with the player;
using the contextual message to increase the amount of information known to an artificial intelligence bot that controls an avatar in the game;
having the artificial intelligence bot change a state of the avatar it controls based on the increase in information; and
displaying a change in the avatar controlled by the artificial intelligence bot on a display associated with the gaming device based on the change in state of the avatar controlled by the artificial intelligence bot.

18. The method of claim 17 wherein the player comprises a second artificial intelligence bot that controls a second avatar in the game.

19. The method of claim 18 wherein changing the state of the avatar controlled by the artificial intelligence bot comprises moving the avatar towards the different location.

* * * * *